V. HYATT.
Horse Rake.
No. 18,850.
2 Sheets—Sheet 1.
Patented Dec. 15, 1857.
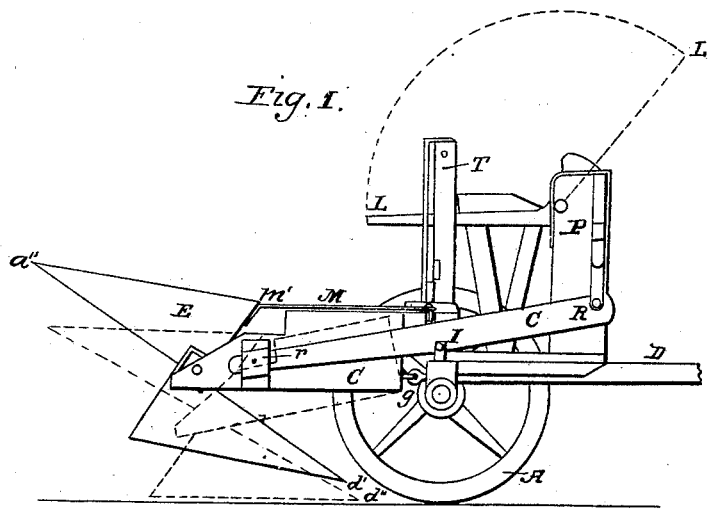
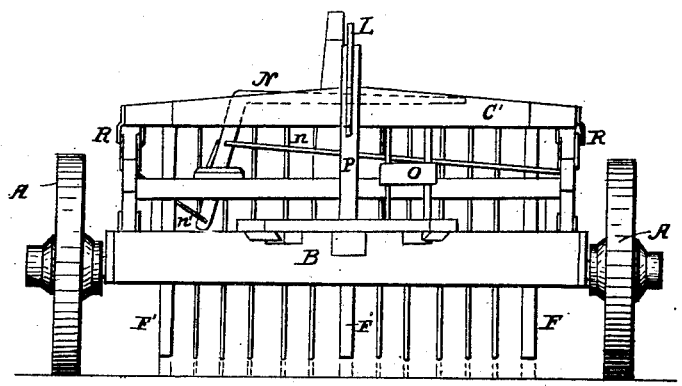
Inventor:
Valentine Hyatt

V. HYATT.

Horse Rake.

No. 18,850.

2 Sheets—Sheet 2.

Patented Dec. 15, 1857.

Inventor,
Valentine Hyatt

UNITED STATES PATENT OFFICE.

VALENTINE HYATT, OF WESTFIELD, OHIO.

IMPROVEMENT IN HORSE-RAKES.

Specification forming part of Letters Patent No. 18,850, dated December 15, 1857.

*To all whom it may concern:*

Be it known that I, VALENTINE HYATT, of Westfield, in the county of Medina and State of Ohio, have invented a new and useful Improvement in Machines for Raking Hay, Grain, &c.; and I do hereby declare that the following is a full and exact description of the same, reference being had to the accompanying drawings, in which—

Figure 1 is a side view of the machine; Fig. 2, a front view, and Fig. 3 a top view. The other views are detached sections, which will be referred to in description.

Like letters refer to like parts in the different views.

The nature of my invention consists in the construction of a revolving rake, so arranged that it can be discharged of its burden at any moment by the hand of the driver, the rake performing half a revolution at each discharge; also, in the means of elevating the rake, so that it will pass clear of obstructions and of the ground when it is desired not to use it; but the parts herein described separately considered are not claimed to be new.

A A represent the wheels, only one of which is shown in Fig. 1, the other being removed; B, the axle-tree. (Seen in Figs. 2 and 3.) A frame-work consisting of two side pieces or levers, C C, and a cross-bar in front, is seen at C', Fig. 3.

Figure 3:
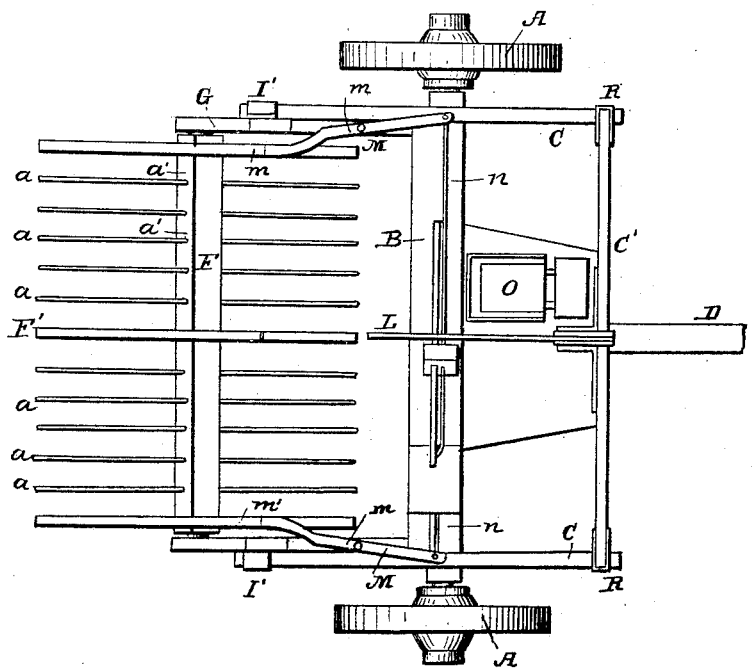

The pole or tongue by which the machine is drawn and guided is seen in part at D in Figs. 1 and 3. An end view of the rake is seen at E E in Fig. 1. Both ends of the rake are alike—that is, they are composed of two triangular pieces or runners attached to a square shaft, (seen at F, Fig. 3.) There is also a pair of these triangular pieces in the middle of the shaft F, as seen at F'. These pieces are also shown at F' F' F' in Fig. 2.

The teeth of the rake are represented at $a$ $a$ $a$, Figs. 2 and 3, and pass through the shaft as represented at $a'$ $a'$, and have therefore the position of the line $a''$ $d'$ in Fig. 1.

The shaft F has its two journals resting in the side pieces or arms, G G, Figs. 1 and 3. These side pieces, G, are attached to the axle-tree by a hinge or joint on each side, one of which is seen at $g$, Fig. 1, thus allowing the rake to be elevated by means hereinafter to be described, so that the machine may be moved forward without having the rake touch the ground, as seen at $d'$, Fig. 1. The red lines indicate its position on the ground in connection with the levers C C and arms G.

Figure 4:
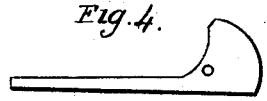

For the purpose of thus elevating and depressing the rake there are two levers, C C, Figs. 1 and 3, which rest upon a fulcrum, I, Fig. 1, about the middle portion of the lever. The rear ends of the levers C are secured by a strap and pin to the side pieces, G G, as seen at I' I' I', Figs. 1 and 3. The forward ends of these levers, which extend to the cross-bar C', and to which they are attached, can be depressed by means of depressing the cross-bar C', which is operated by means of a cam-lever, L, Figs. 1, 2, and 3. (Shown also in detached section, Fig. 4.) When this lever L has been turned forward in the direction of the arrow in Fig. 1 to L' it remains in that position by its own weight. By this means the cross-bar C' and the levers C C are depressed and the rake raised from the ground, as seen in Figs. 1 and 2. By returning the bar to its position at L, Fig. 1, the rake will drop to the ground, as indicated by the red lines at $d''$. When the rake is in the proper position to gather the hay it is supported from revolving by the bent levers M M, Figs. 1 and 3. These levers are supported by the pin seen at $m$, which enters the side pieces, G G, Figs. 1 and 3, and which retain the levers in place. The back and bent end of the lever rests against the triangular end pieces, E E, of the rake, as seen at $m'$ $m'$ $m'$, Figs. 1 and 3. These levers have a horizontal movement outward, the short or forward arm of the levers M M being drawn inward by a bent lever, N, Fig. 2, which is attached to the levers M M by the two connecting-rods $n$ $n$, which take hold of the short ends of the levers. The driver, by sitting in his chair O, can elevate the lever N at pleasure, and whenever this lever is elevated the connecting-rods $n$ $n'$ draw the short arm of the bent levers M M inward, and these moving upon the fulcrum at $m$ $m$, the long or bent arm moves outward, releasing the rake from its support against the levers at $m'$ $m'$. The points of the teeth and runners will then catch in the ground, causing the rake to perform half a revolution in the direction of the arrow. The lever N being dropped, the bent levers return to their places, and again support the rake till it is again filled or until it is released by the operator in the manner just described.

Figure 5:
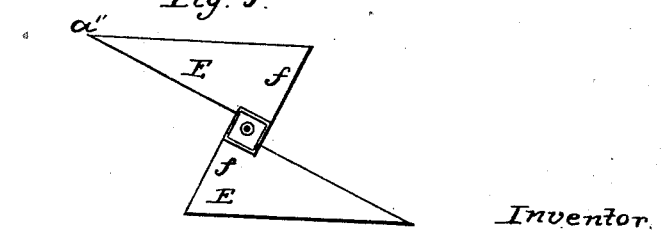

While the rake is being filled the runners E slide upon the ground, as indicated by the red line $d''$, Fig. 1. By means of the projection $f$ or wide end of the runners next to the shaft the hay in loading is prevented from passing back to the end of the rake-teeth at $a$, Figs. 3 and 5, when in this position; thus the hay will be cleanly gathered into compact windrows without scattering of the hay.

P is a standard to which the lever is connected, and through which the cross-bar crosses, so that in elevating the lever L the cross-bar is depressed, it being attached to the levers C C by a strap or joint at R, or in any other suitable manner.

The standard T aids in supporting and keeping the lever N and rod in place as they are operated for the purpose of working the rake.

Having thus fully described my invention, what I claim, and desire to secure by Letters Patent of the United States, is—

1. The combination of the lever L, cross-bar C′, levers C C, and arms G G, for raising the rake from the ground when not in use, as described.

2. The combination of the lever N, connecting-rods $n\ n$, levers M M, and arms G G, for holding the rake while it is filling with hay, and for discharging the load, as set forth.

VALENTINE HYATT.

Witnesses:
W. H. BURRIDGE,
JEHU BRAINERD.